Oct. 26, 1948.                R. F. HELMKAMP                 2,452,189
                           UNIVERSAL TORCH MACHINE
Filed Oct. 9, 1944                                          2 Sheets-Sheet 1

INVENTOR
RICHARD F. HELMKAMP
BY
ATTORNEYS

Oct. 26, 1948.   R. F. HELMKAMP   2,452,189
UNIVERSAL TORCH MACHINE
Filed Oct. 9, 1944   2 Sheets-Sheet 2

INVENTOR
RICHARD F. HELMKAMP
BY
ATTORNEYS

Patented Oct. 26, 1948

2,452,189

UNITED STATES PATENT OFFICE 2,452,189

UNIVERSAL TORCH MACHINE

Richard F. Helmkamp, Jersey City, N. J., assignor to Air Reduction Company, Incorporated, a corporation of New York Application October 9, 1944, Serial No. 557,770

3 Claims. (Cl. 266—23)

This invention relates to universal gas torch welding and cutting machines and more particularly to torch machines of the pantograph type and to means for guiding the machine over the work surface.

In the Anderson Patent No. 2,278,607 there is shown in a torch cutting machine a wheeled carriage which is dependent upon the side edges of a special table to guide it over the work during a cutting operation. Spaced carriage wheels are provided with side flanges which co-operate with the table side edges and maintain the machine on its straight path. Such machine is not adaptable for cutting upon a wide plate since, if the wheeled carriage which supports the torch were removed from its guide table for such purpose, the machine would be incomplete and without means to guide the wheeled carriage.

It is an object of the present invention to provide a universal cutting and welding machine which may rest directly upon the metal workpiece being cut and be guided by a template in the form of an angle iron or the like which can be attached to the work-piece in a variety of positions thereon adjacent the line of cut.

According to this invention, the carriage for the torch is provided with supporting wheels and two sets of two guiding rolls along one side thereof adapted to be clutched over an angle iron template removably attached to the work surface at a location adjacent to the line of cut. The rolls respectively bear against vertical side faces of the angle iron and function as a template follower for determining the course to be followed by the carriage. The bar which supports the torch and tracer extends over the angle iron guide or template to the opposite side thereof so that the tracer may be located at a point removed from the path of the carriage body and torch.

For a better understanding of the invention, reference may be had to the detailed description taken in connection with the accompanying drawings, in which Fig. 1 is a plan view of the torch machine embodying the features of the invention;

Figure 1:
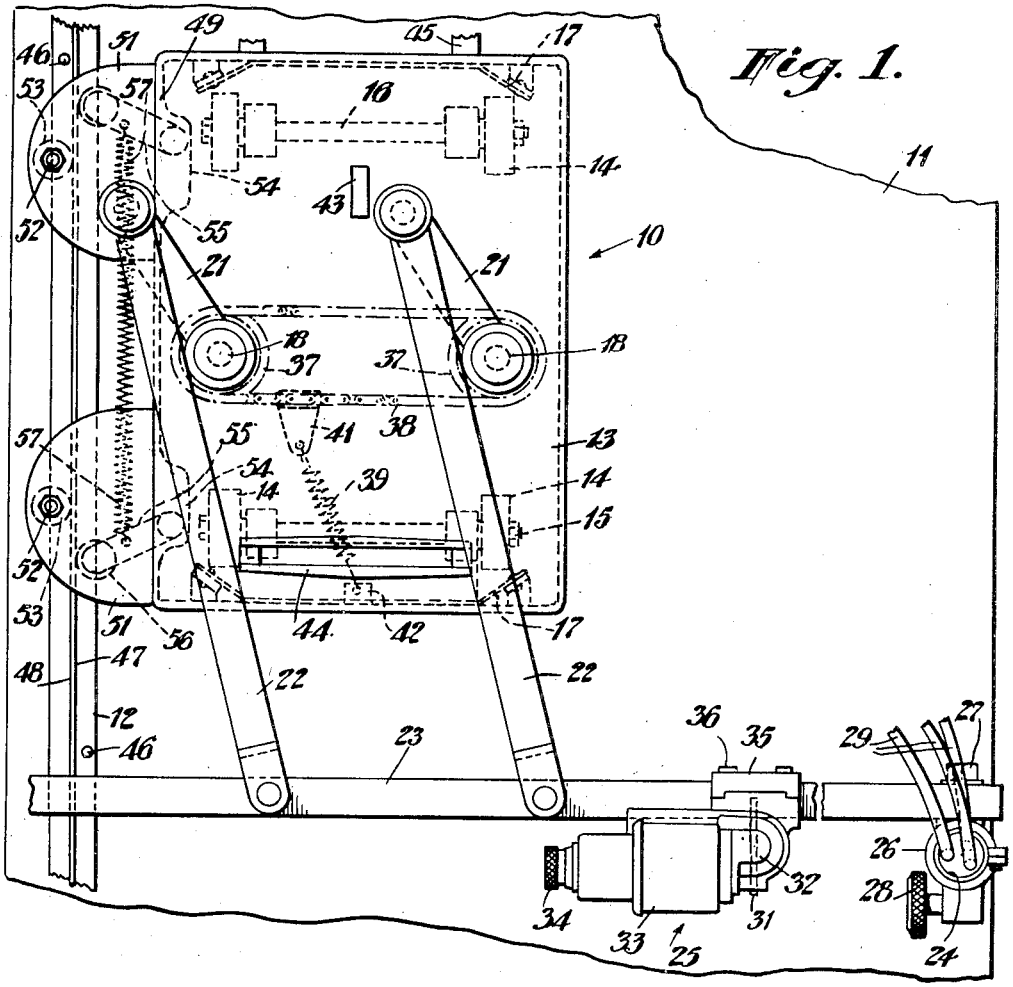

Referring now to the figures, there is generally disclosed a torch cutting machine 10 supported on the surface of a work-piece 11 and guided by an angle or the iron guide or strip 12 which is secured to the work-piece surface and functions as a template for determining the course to be followed by the carriage. The machine 10 includes a carriage body 13 with flat wheels 14 on front and rear axles 15, 16 and wipers 17 associated with each wheel to clear the work surface of loose matter for the passage of the wheels thereover. Extending vertically upwardly from the top of the carriage body 13 are spaced shafts 18 to each of which is respectively connected for lateral swinging movement a pair of articulated links 21, 22. Corresponding links of the pairs are retained parallel to each other with the links 22 extending to the front of the machine to swing laterally a transverse bar 23 supporting torch 24 and tracer or template follower 25 which may follow a template or outline formed on the workpiece 11 or on a paper pattern placed on the workpiece. The torch 24 is secured to the support bar 23 by its holder 26 and bolt 27 and is adjusted in the holder 26 by turning hand screw 28. Gas pipes 29 lead to a suitable gas supply source.

Figure 4:
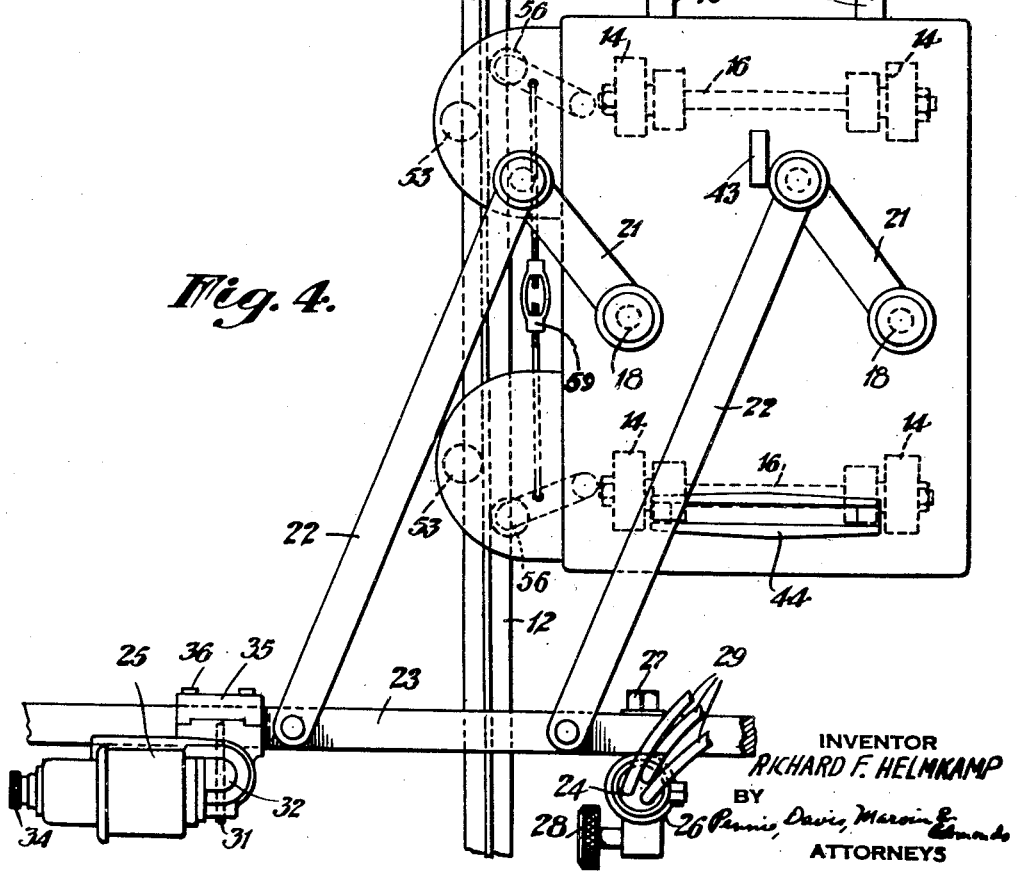
Fig. 4 is a plan view of a machine with the tracer mounted on the support bar at the opposite side of the angle iron guide.

The tracer or template follower 25 has a traction wheel 31 driven through reduction gearing 32 by motor 33 whose speed is controlled by an adjustable speed governor 34. Clamping plate 35 and bolts 36 adjustably secure the tracer to the support bar 23. The tracer can be located on the bar 23 between links 22, to one side of the links adjacent torch 24, or to the left of the links so as to operate on the opposite side of the guiding iron 12, Fig. 4. The links 21, 22 and bar 23 provide linkage means for supporting torch 24 and tracer 25.

The shafts 18 extend below the top of the carriage body and have sprockets 37 which are tied together by chain 38 to insure parallel operation of the articulated links. A spring 39 secured between bracket 41 on the chain 38 and bracket 42 on the carriage body resist the movement of the linkage with respect to the carriage body. The force of the tracer urging the movement of the linkage is transmitted through this spring to the carriage body to move the machine over the work surface 11. To prevent the linkage from folding back on itself which would damage spring 39, the links abut stop 43. The machine may be moved over the work by hand by grasping handle projections 44, 45.

The guiding iron 12 is made fast to the workpiece 11 by screws 46 or other suitable means and has two parallel vertically extending faces 47, 48.

The guiding iron can be either of L or T cross-section.

Figure 2:
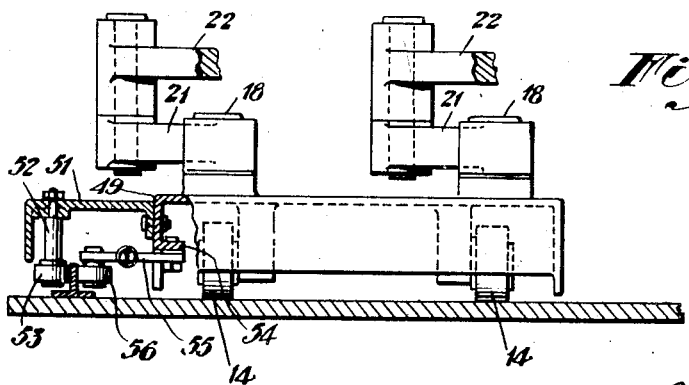
Fig. 2 is a fragmentary end elevational view of the carriage and showing in section one roll set support.
Figure 3:
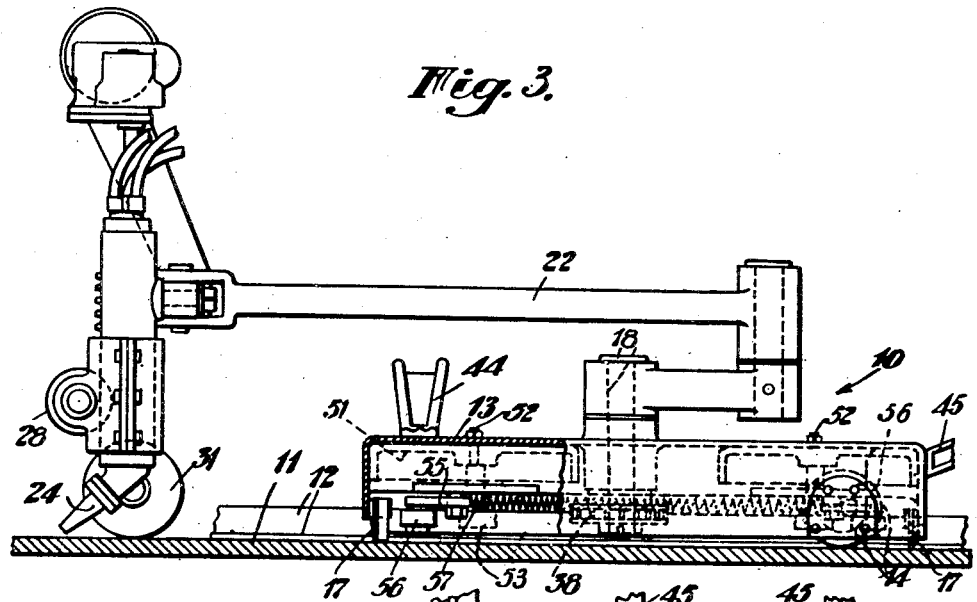
Fig. 3 is a side elevational view of the cutting machine with portions of the carriage body broken away to show one set of rolls in full.

Attached to the guide side 49 of carriage body 13 are two laterally extending roll supporting lugs or brackets 51, Fig. 2, each of which carry a depending shaft 52 with a roll 53 thereon adapted to roll over vertical face 48 of the guiding iron 12.

Depressed inwardly from the guide side 49 adjacent the lugs 51 are laterally extending flanges 54, Fig. 2, on which are respectively pivotally mounted opposing roll arms 55 having rolls 56 lying, respectively, at opposite sides of rolls 53 but bearing on opposite vertical guiding iron face 47. The rolls 56 are resiliently restrained against outward movement by a spring 57 whereby the rolls are kept in tight, substantially equalized engagement with the guiding iron or template faces, so that the rolls form an idler template follower. The machine is thus clutched to the guiding iron or template 12 at each end thereof by two rolls 53, 56 and is thereby guided by the iron whether it be propelled by the tracer 25 or by hand. The rolls, being idlers, will also adjust themselves to a guiding iron or template that is curved throughout its length. Also, with a straight guiding iron or template, a turnbuckle 59, Fig. 4, can be used instead of the spring 57.

While the machine has been described as a cutting machine, it will be apparent that, by mere substitution of a welding torch for the cutting torch, a welding machine is provided.

The tracer 25 is either guided by hand or by a tracer template placed on the work surface.

What is claimed is:

1. A universal torch machine comprising a carriage having wheels adapted to run directly on a work-piece surface, a torch mounted on the carriage for lateral movement with respect thereto, a guiding strip adapted to be fastened to the work-piece and having two vertically disposed faces, a pair of rolls one of which is mounted near the front of the carriage and the other of which is mounted near the rear thereof, said rolls being arranged to engage one of the vertical faces of the guiding strip, a second roll cooperating with each of said first-named rolls and engaging the other vertical face of the strip, roll support arms for respectively carrying said last-named rolls and pivotally connected to the torch carriage for movement in a horizontal plane, and means directly connecting said roll support arms for maintaining the rolls in substantially equalized, clutched relation with the guiding strip faces.

2. A universal torch machine comprising a carriage having wheels adapted to run directly on a work-piece surface, said carriage having a side portion, a torch mounted on the carriage for lateral movement with respect thereto, a guiding strip adapted to be fastened to the work-piece and having two vertically disposed faces, a pair of roll supporting brackets one of which is secured to the side portion of the carriage near the front of the carriage and the other of which is secured to the side portion of the carriage near the rear of the carriage, a shaft with a roll thereon depending from each of said brackets for the engagement of the roll with one vertical face of the guiding strip, a second roll cooperating with each of said first-named rolls and engaging the other vertical face of the strip, roll support arms for respectively carrying said last-named rolls and pivotally connected to said side portion of the carriage for movement in a horizontal plane, and means directly connecting said roll support arms for maintaining the rolls in substantially equalized, clutched relation with the guiding strip faces.

3. A universal torch machine as set forth in claim 1 in which the means directly connecting said roll support arms includes spring means effective to exert a force on said roll support arms in a direction to pull them towards one another.

RICHARD F. HELMKAMP.

REFERENCES CITED

The following references are of record in the file of this patent:

UNITED STATES PATENTS

| Number | Name | Date |
|---|---|---|
| 1,162,587 | Eimann | Nov. 30, 1915 |
| 2,032,733 | Anderson | Mar. 3, 1936 |
| 2,085,112 | McKiernan | June 29, 1937 |
| 2,183,605 | Bucknam | Dec. 19, 1939 |
| 2,278,607 | Anderson | Apr. 7, 1942 |
| 2,403,514 | Franzen | July 9, 1946 |

FOREIGN PATENTS

| Number | Country | Date |
|---|---|---|
| 230,571 | Great Britain | Mar. 19, 1925 |